(12) United States Patent
Lanchava et al.

(10) Patent No.: US 9,465,285 B2
(45) Date of Patent: Oct. 11, 2016

(54) LIGHT UNIT COMPRISING AN ILLUMINATION UNIT AND A PROJECTION UNIT

(75) Inventors: Bakuri Lanchava, Regensburg (DE); Michael Wolfsteiner, Obertraubling (DE)

(73) Assignee: OSRAM GmbH, Munich (DE)

( * ) Notice: Subject to any disclaimer, the term of this patent is extended or adjusted under 35 U.S.C. 154(b) by 323 days.

(21) Appl. No.: 14/002,556

(22) PCT Filed: Feb. 23, 2012

(86) PCT No.: PCT/EP2012/053109
§ 371 (c)(1),
(2), (4) Date: Aug. 30, 2013

(87) PCT Pub. No.: WO2012/116925
PCT Pub. Date: Sep. 7, 2012

(65) Prior Publication Data
US 2013/0335712 A1 Dec. 19, 2013

(30) Foreign Application Priority Data
Mar. 1, 2011 (DE) .................. 10 2011 004 882

(51) Int. Cl.
*G03B 29/00* (2006.01)
*G09F 19/18* (2006.01)
*G03B 21/14* (2006.01)
*G03B 21/16* (2006.01)
*G03B 21/00* (2006.01)

(52) U.S. Cl.
CPC ............. *G03B 29/00* (2013.01); *G03B 21/145* (2013.01); *G03B 21/16* (2013.01); *G09F 19/18* (2013.01); *G03B 21/00* (2013.01)

(58) Field of Classification Search
CPC .... G03B 21/14; G03B 21/16; G03B 21/145; H04N 9/3114; H04N 9/3155; H04N 9/3182

USPC .................. 353/31, 38, 85, 98, 119
See application file for complete search history.

(56) References Cited

U.S. PATENT DOCUMENTS

| 4,106,866 | A | 8/1978 | Shimada et al. |
| 7,188,958 | B2* | 3/2007 | Zoidis .............. G03B 21/142 353/119 |
| 8,740,395 | B2* | 6/2014 | Hill .................. G03B 21/2013 345/156 |
| 2001/0053078 | A1 | 12/2001 | Ishikawa |
| 2002/0008850 | A1 | 1/2002 | Noji et al. |
| 2004/0227905 | A1 | 11/2004 | Kimura |
| 2005/0122481 | A1* | 6/2005 | Yamasaki ............ H04N 9/3197 353/31 |
| 2006/0146015 | A1* | 7/2006 | Buchmann ......... G02B 26/0816 345/156 |
| 2006/0146560 | A1* | 7/2006 | Lewin ................. G01B 11/25 362/560 |
| 2006/0192728 | A1* | 8/2006 | Kim .................... G09G 3/3413 345/46 |

(Continued)

FOREIGN PATENT DOCUMENTS

| AT | 349 325 | 7/1975 |
| DE | 1805445 | 2/1960 |

(Continued)

*Primary Examiner* — Sultan Chowdhury
(74) *Attorney, Agent, or Firm* — Cozen O'Connor

(57) ABSTRACT

A light-emitting unit having a lighting unit (10; 110; 210; 310; 410; 510; 610; 710; 810; 910; 1010; 1110) and a projection unit (12; 112; 212; 312; 412; 512; 612; 712; 812; 912; 1012; 1112), in which the lighting unit and the projection unit adapted to be switched on and off independently of one another.

14 Claims, 14 Drawing Sheets

(56) References Cited

U.S. PATENT DOCUMENTS

2009/0027570 A1* 1/2009 Fujinawa ............... G03B 21/16 348/744
2009/0073706 A1* 3/2009 Tatara ................. B60Q 1/1423 362/487
2009/0256973 A1* 10/2009 Bazzani ............... G09G 3/3426 348/744

FOREIGN PATENT DOCUMENTS

| DE | 8138085 | 6/1982 |
| DE | 10 2008 033 545 | 1/2010 |
| DE | 10 2009 025 975 | 1/2011 |
| JP | 2003-121943 | 4/2003 |
| WO | WO 00/75909 | 12/2000 |
| WO | WO 2010/029425 | 3/2010 |

* cited by examiner

LIGHT UNIT COMPRISING AN ILLUMINATION UNIT AND A PROJECTION UNIT

RELATED APPLICATIONS

This is a U.S. national stage of International application No. PCT/EP2012/053109 filed on Feb. 23, 2012.

This application claims the priority of German application no. 10 2011 004 882.0 filed Mar. 1, 2011, the entire content of which is hereby incorporated by reference.

FIELD OF THE INVENTION

The invention is related to a light-emitting unit comprising a lighting unit and a projection unit.

BACKGROUND OF THE INVENTION

A light-emitting unit comprising a lighting unit and a projection unit is known.

The "UKW-Radio mit Projektionsuhr" [VHF radio with projection clock] by LUNARTEC (http://www.pearl.de/a-PE6822-1606.shtml) discloses a light-emitting unit comprising a luminaire, a projector and an integrated VHF radio. The luminaire performs the function of spreading a relaxing and pleasant light, and the projector projects a time of day in the direction of the ceiling of a room. An LED lamp acts as light source.

One disadvantage with this solution is its lack of flexibility in use. For example, the light is emitted diffusely substantially uniformly in the direction of the complete half space above the standing area of the radio. It is comparatively weak, cannot be focused and its luminous intensity is not variable. Thus, the luminaire of the light-emitting unit is not suitable for lighting tasks with more stringent requirements in respect of the light quality. An application area of the projector is likewise restricted. Thus, for example, the projection direction of the time of day is fixed or non-adjustable and the content of the projection or the information content of the projection is exclusively restricted to the time of day.

A "Space Projector" by Mathmos (http://www.mathmos.de/space-projector-light-9466-0.html) features a light-emitting unit comprising a luminaire and a comparatively more versatile projector, wherein the luminaire and the projector have a common light source. The luminaire propagates an ambient light over a diffuse-transparent housing part, and the projector projects an image of a transparent graphics or gobo disk with or without an upstream color filter in a spatial region slightly above a horizontal. The graphics or gobo disk or the color filter can be changed manually and a sharpness of the projection is manually adjustable.

One disadvantage with this solution furthermore consists in that the projection direction is fixed and is only variable via a change in the alignment of the space projector on its standing area. The projection is restricted to artistic content. The luminous efficiency is low and is not suitable for task lighting, for example for reading.

The two light-emitting units from the prior art have the common feature that they are inflexible in terms of their application and are very limited.

SUMMARY OF THE INVENTION

One object of the present invention is to provide a light-emitting unit comprising a lighting unit and a projection unit which is more flexible in terms of application.

According to one aspect of the invention, a light-emitting unit has a lighting unit for providing light or for illuminating an environment and a projection unit for projecting images, information or other projection contents. The lighting unit and the projection unit can be switched on and off independently of one another. Thus, the light-emitting unit can be operated flexibly, by the lighting unit or projection unit being correspondingly switched on or off, either in a "light-emitting mode", in which only the lighting unit is switched on and the projection unit is switched off or in a standby state, or in a "projection mode", in which only the projection unit is switched on and the lighting unit is switched off or in the standby state, or in a "mixed mode", in which the lighting unit and the projection unit are switched on, or in a "dynamic mode" in which the units are repeatedly switched on and off again or switched into the standby mode, or in a "dark mode" in which both units are switched off or are in the standby mode. Thus, the operation of the light-emitting unit is made more flexible in comparison with the prior art, in which, owing to the lack of switchability of the individual units, only a "mixed mode" with units which are switched on at the same time is made possible.

In an advantageous development of the light-emitting unit, a lighting property of the lighting unit or a projection property or a projection content of the projection unit is variable, with the result that the light-emitting unit can be matched to the requirements of the environment. The variable lighting property is preferably a luminous intensity or light color or light temperature. The variable projection property is preferably a projection direction or projection sharpness or projection brightness or a projection contrast or a size of a projection window. The variable projection content is preferably a projected image or a projected film or a projected item of information or a projected advertisement.

The lighting unit of the light-emitting unit preferably has an LED or a multiplicity of LEDs as light source or light-emitting element. A plurality of LEDs can in this case be combined particularly advantageously in an LED light engine.

In order to increase a luminous efficacy of the light-emitting unit or the lighting unit and to emit directional or focused light, the lighting unit has a reflector in a preferred development of the light-emitting unit.

In order to be able to arrange or fasten the light-emitting unit securely, in an advantageous development it has an apparatus for arranging or fastening it in a lying, standing or hanging position.

In a further particularly advantageous development of the light-emitting unit, the projection unit has a projector or a laser projector, with the result that a wide variety of projection contents can be projected with very high quality. The projection unit can also have a plurality of, for example two to ten, projectors or laser projectors, wherein the number is not restricted. Laser projectors are in this case advantageously constructed so as to be particularly compact or small, with the result that very small light-emitting units are possible.

Preferably, the light-emitting unit has a projection window, through which a projection takes place, and via which a projection direction can be fixed. The projection unit can also have a plurality of, for example two to ten, projection windows, wherein the number is not restricted. The projection of a projector or laser projector associated with the projection window can take place through each projection window.

A projection direction of the projection unit is preferably fixed when the light-emitting unit is intended to have a simple design in terms of apparatus technology. As an alternative to this, it is variable, which has the advantage that the operation of the light-emitting unit can be flexibilized additionally. A change in the projection direction preferably takes place via a change in a spatial arrangement of the projection window.

In a particularly advantageous development, the projection direction or the spatial arrangement of the projection window is variable via an actuating unit, in particular a positioning motor or a servo motor.

In order to be able to dissipate waste heat from the light-emitting unit, in particular the lighting unit or the projection unit, in a preferred development the light-emitting unit has a cooling unit. Preferably, this cooling unit is formed via a metal sheet with cooling ribs, a so-called heat sink. Preferably, the light-emitting unit is surrounded at least sectionally by the cooling unit.

In a particularly preferred and advantageous development, the light-emitting unit has a control unit, which can be connected, in particular is connected to the lighting unit or the projection unit or the actuating unit via a data link, and via which the lighting unit or the projection unit can be switched on and off or switched into the standby state, or via which the lighting property of the lighting unit or the projection property or the projection content of the projection unit is variable. The control unit is preferably connected to a voltage source.

In a further particularly preferred and advantageous development, the light-emitting unit has a control interface, in particular a user interface for inputting data or commands, which interface can be connected to the control unit via a data link.

In particular in order to be able to store control programs or lighting properties of the lighting apparatus or projection properties or projection contents of the projection unit for the control unit, the light-emitting unit has a memory unit, which can be connected to the control unit via a data link.

The data link is preferably a data bus or a LAN connection or a WLAN connection or a Bluetooth connection or an infrared connection.

In a preferred development of the light-emitting unit, said light-emitting unit has a housing, in which the lighting unit and the projection unit are arranged at least sectionally.

In a preferred variant of the light-emitting unit as an alternative to this, the projection unit is surrounded at least sectionally by the lighting unit, in particular by a housing of the lighting unit, or vice versa.

A longitudinal axis of the projection unit is preferably arranged approximately coaxially to a longitudinal axis of the lighting unit. As an alternative to this, the longitudinal axis of the projection unit is parallel to the longitudinal axis of the lighting unit or the longitudinal axes are adjusted or adjustable with respect to one another.

In a particular advantageous alternative of the light-emitting unit in which it is designed to be small, the lighting unit and the projection unit are arranged within a region which is delimited via a lamp base and a lamp bulb with the result that the light-emitting unit is particularly compact and is substantially in the form of a lamp, in particular a retrofit lamp.

BRIEF DESCRIPTION OF THE DRAWING(S)

DETAILED DESCRIPTION OF THE DRAWINGS

Figure 1:
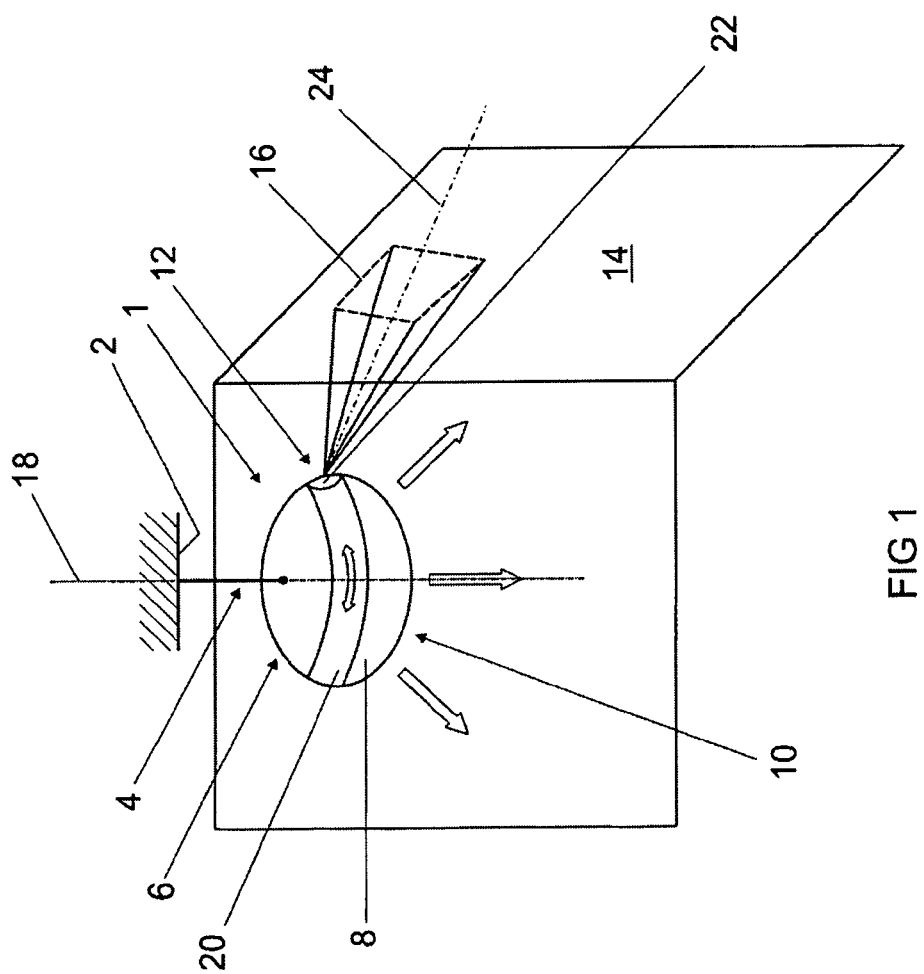
FIGS. 1 to 3 show a schematic illustration of a first exemplary embodiment of a light-emitting unit in three different modes in a perspective view.
Figure 2:
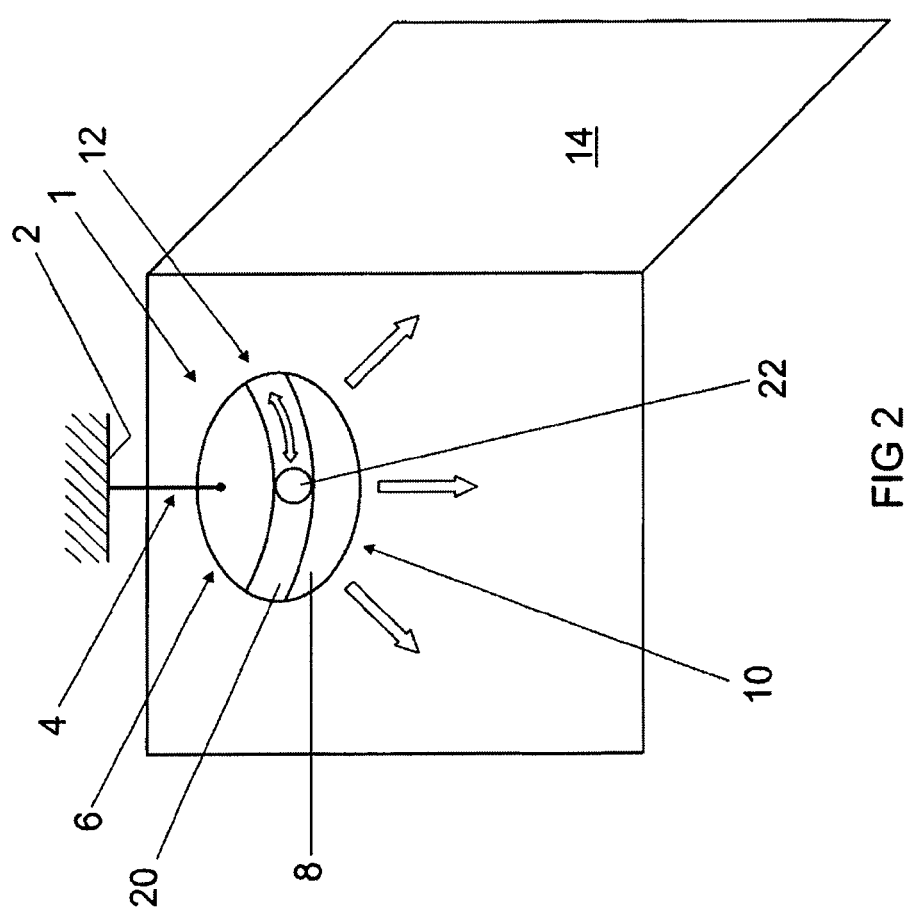
Figure 3:
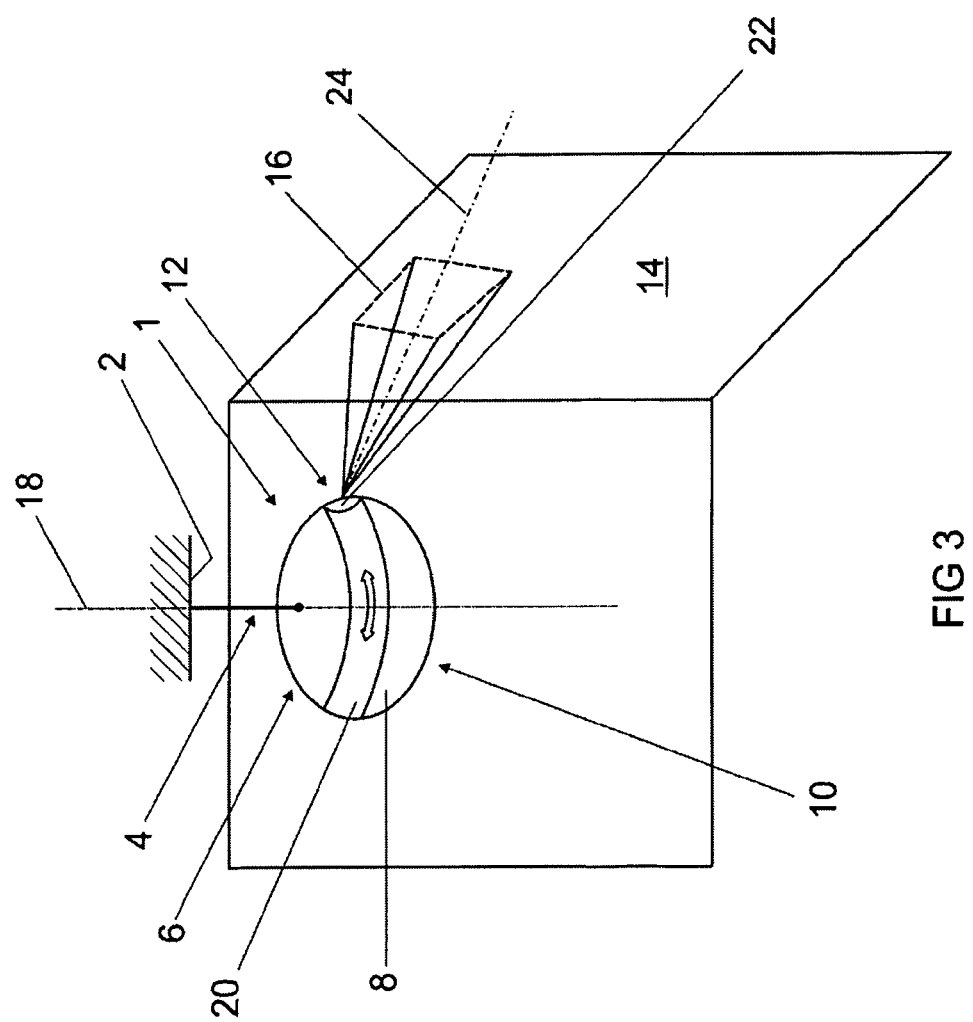

FIGS. 1 to 3 show a schematic illustration of a first exemplary embodiment of a light-emitting unit 1 according to the invention in three different operating modes in a perspective view.

In FIG. 1, the light-emitting unit 1 is fastened to a ceiling 2 of a room with the aid of an apparatus 4 in the form of a pendant suspension means. The light-emitting unit 1 has an approximately oval housing 6, which is formed as a transparent disk 8 on its lower side in FIG. 1. The light-emitting unit 1 has a lighting unit 10 with a multiplicity of LED lamps (not illustrated) arranged in a light engine and a projection unit 12.

In this mode, light (symbolized by three arrows in FIG. 1) is emitted downwards by means of the lighting unit 10, and in this mode an image 16 is projected by the projection unit 12 onto a surface 14 of a wall of the room.

A laser projector (not illustrated) of the projection unit 12 is arranged within the light-emitting unit 1. The light-emitting unit 1 is sectionally surrounded by a projection shield 20, which has a projection window 22, on an outer side.

As indicated by a double arrow, the projection shield 20 is rotatable via a positioning motor (not illustrated) arranged in the light-emitting unit 1 towards the left or towards the right relative to the housing 6 about a longitudinal axis 18 in FIG. 1, with the result that a projection direction 24 is variable.

Furthermore, a control unit is arranged in the light-emitting unit 1, said control unit being connected to the lighting unit 10, the projection unit 12 and the positioning motor via a data bus. In addition, a memory unit is arranged in the light-emitting unit 1, said memory unit being connected to the control unit via a data bus. Operating modes or operating states of the units, lighting properties, light properties, projection properties and projection contents are stored in the memory unit.

The light-emitting unit 1, the lighting unit 10 and the projection unit 12 can be switched on or off or switched into a standby state via the control unit. Furthermore, the operating modes or operating states of the units, the lighting properties, the light properties, the projection properties, the projection direction 24 and the projection corrections can be controlled or varied by the control unit. In this way, the light-emitting unit 1 can be operated via the control unit in a "lighting mode" (projection unit switched off or in the standby state), a "projection mode" (lighting unit switched off or in the standby state), a mixed mode (lighting unit and projection unit switched on), a "dynamic mode" (program-controlled switching-on and switching-off of units) or a "dark mode" (all units switched off or in the standby state).

The light-emitting unit 1 shown in FIG. 1 is operated in a program-controlled "dynamic mode".

In order to enable communication with the control unit and make inputs, the light-emitting unit 1 has a control interface or a user interface which can be connected to the control unit via WLAN. The control unit is also connected to a voltage source, via which all of the units are supplied with power.

FIG. 2 shows the first exemplary embodiment of the light-emitting unit 1 shown in FIG. 1 in the "lighting mode". By means of the control unit, the lighting unit 10 is switched on and the projection unit 12 is switched off or in the standby state. As a deviation from the illustration shown in FIG. 1, the projection window 22 is facing the viewer.

FIG. 3 shows the first exemplary embodiment of the light-emitting unit 1 shown in FIGS. 1 and 2 in the "projection mode". By means of the control unit, the lighting unit 10 is switched off or in the standby state and the projection unit 12 is switched on.

Figure 4:
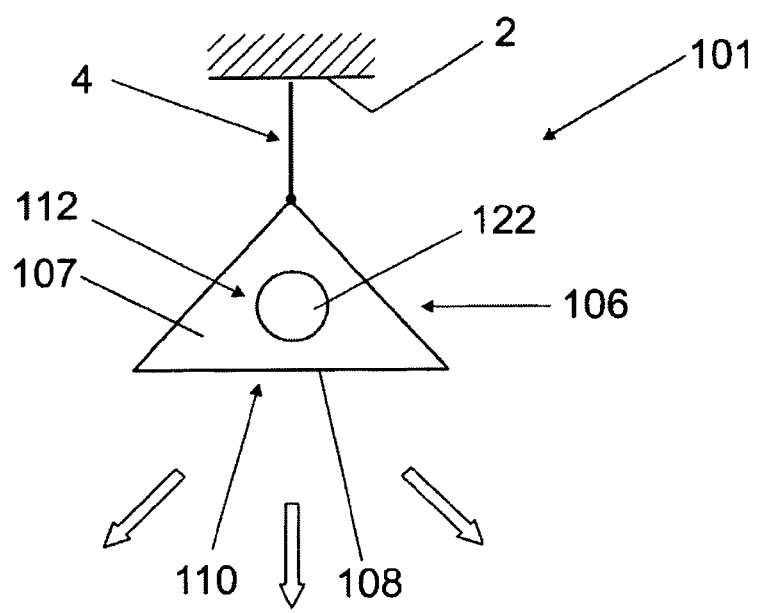
FIG. 4 shows a schematic illustration of a second exemplary embodiment of a light-emitting unit according to the invention in a side view.

FIG. 4 shows a schematic illustration of a second exemplary embodiment of a light-emitting unit 101 according to the invention in a side view. The light-emitting unit 101 is operated in the "lighting mode".

As a deviation from the first exemplary embodiment shown in FIGS. 1 to 3, the light-emitting unit 101 has a conical housing 106, with a disk 108 arranged on the lower side (in FIG. 4) thereof, through which disk light from a lighting unit 110 exits downward in FIG. 1. A circumferential area 107 of the housing 106 is opaque-transparent in comparison with the disk 108, with the result that diffuse light from the lighting unit 110 is emitted via the circumferential area 107. A projection window 122 of a projection unit 112 arranged in the housing 106 is formed fixedly in the housing 106 of the light-emitting unit 101.

Figure 5:
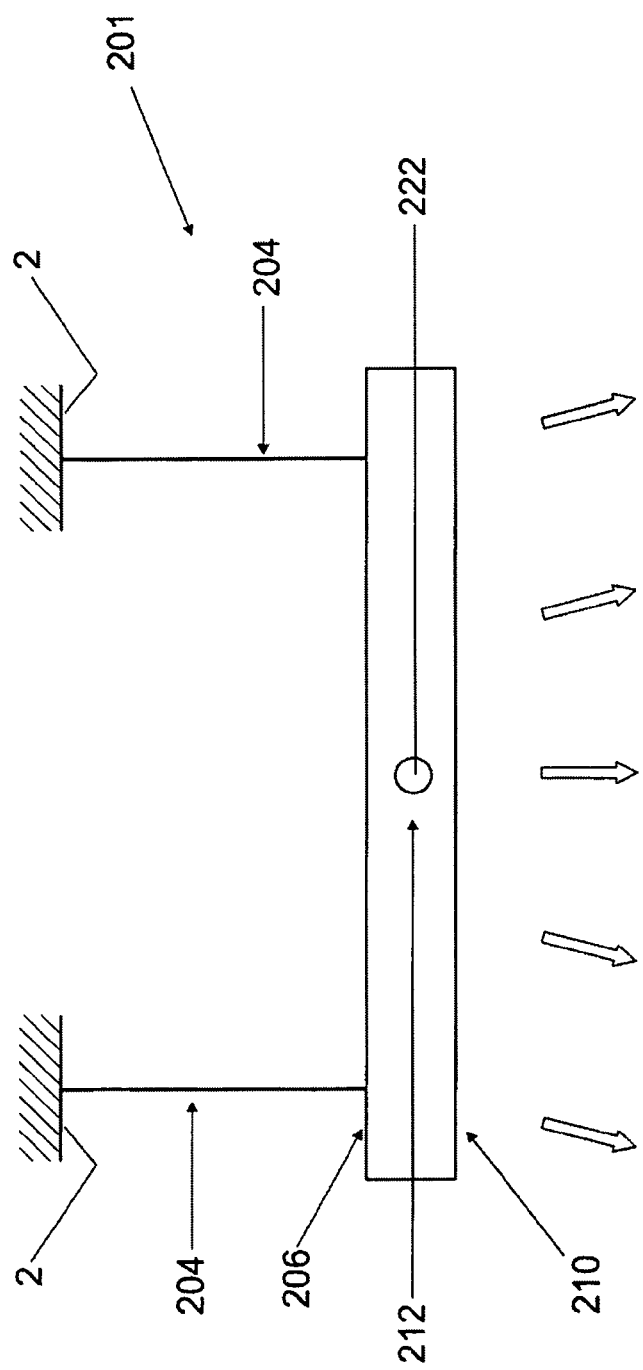
FIG. 5 shows a schematic illustration of a third exemplary embodiment of a light-emitting unit according to the invention in a side view.

FIG. 5 shows a schematic illustration of a third exemplary embodiment of a light-emitting unit 201 according to the invention in a side view. The light-emitting unit 201 is operated in the "lighting mode".

As a deviation from the preceding exemplary embodiments, the light-emitting unit 201 is in the form of a specular louver luminaire with a substantially right-parallelepipedal housing 206, from which light from a lighting unit 210 exits downward in FIG. 5. A projection unit 212 is arranged in the housing 206, with only one projection window 222 formed fixedly in the housing 206 of said projection unit 212 being shown. The light-emitting unit 201 is suspended from the ceiling 2 via two apparatuses 204.

Figure 6:
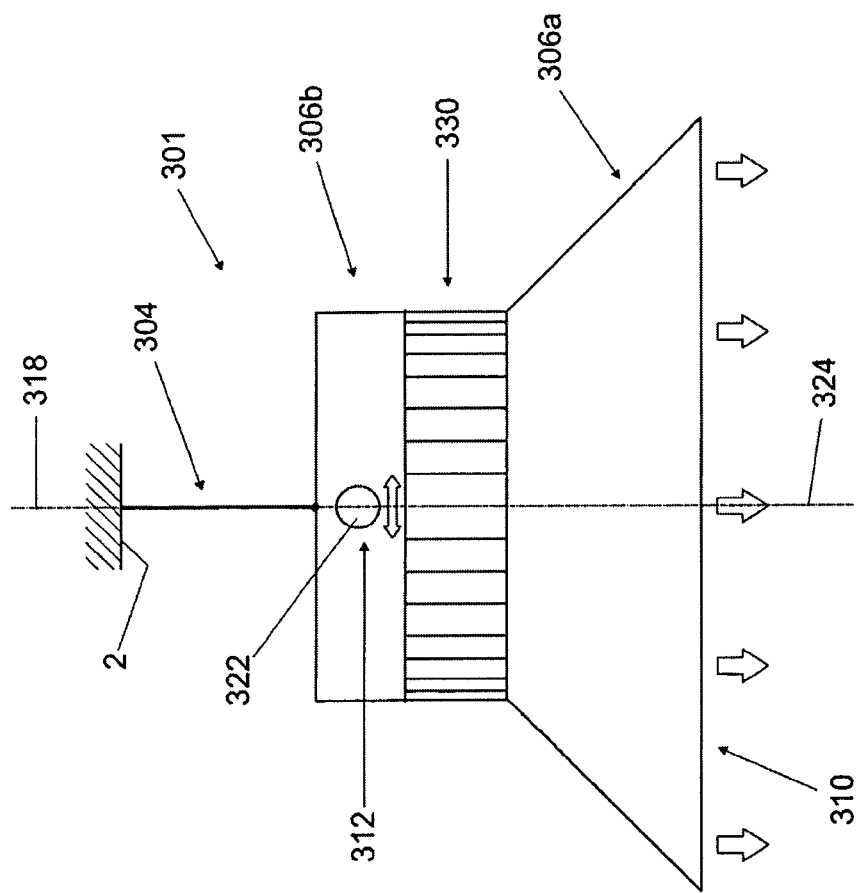
FIG. 6 shows a schematic illustration of a fourth exemplary embodiment of a light-emitting unit according to the invention in a side view.

FIG. 6 shows a schematic illustration of a fourth exemplary embodiment of a light-emitting unit 301 according to the invention which is operated in the "lighting mode" in a side view.

As a deviation from the preceding exemplary embodiments, the light-emitting unit 301 is in the form of a pendant luminaire with a housing section 306a in the form of a truncated cone, said housing section being shaped as a reflector on its inner side, and with a circular-cylindrical housing section 306b. Light from an LED light engine which has a multiplicity of LEDs exits downward from the light-emitting unit 301 in FIG. 6. A projection unit 312 with a laser projector is arranged in the housing section 306b. Furthermore, a control unit is arranged in the light-emitting unit 301, said control unit being connected to a positioning motor, the projection unit 312 and the lighting unit 310 via Bluetooth. Since LEDs generate a large amount of waste heat, the light-emitting unit 301 additionally has, radially over the circumference, a so-called heat sink or cooling unit 330 with a multiplicity of metallic ribs arranged perpendicularly in FIG. 6.

Figure 7:
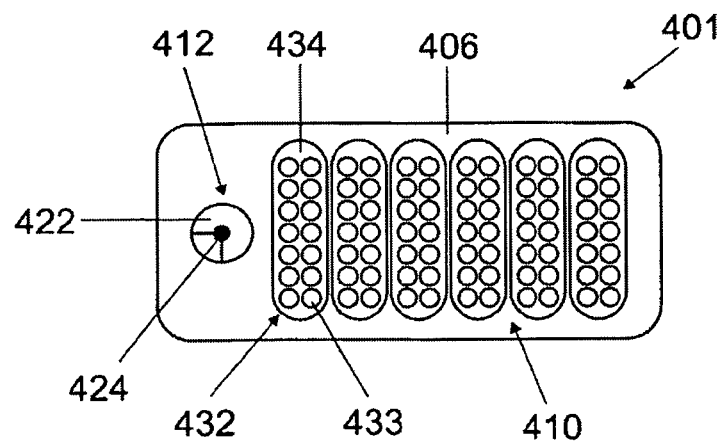
FIG. 7 shows a schematic illustration of a fifth exemplary embodiment of a light-emitting unit according to the invention in a lateral partial section.

FIG. 7 shows a schematic illustration of a fifth exemplary embodiment of a light-emitting unit according to the invention in a view from below.

As a deviation from the preceding exemplary embodiments, the light-emitting unit 401 has a housing 406, into which in total 6 LED light engines 432 of a lighting unit 410 are inserted, which each have 14 individual LEDs 433. In this case, the LEDs 433 are each arranged in a reflector 434 so as to generate a light which is as directional as possible. The reflectors 434 have an elongate shape and are inserted into slots in the housing 406. On the left-hand side in FIG. 7, the housing 406 has a projection window 422, wherein a projection unit 412 is arranged behind this at the rear in FIG. 7.

Figure 8:
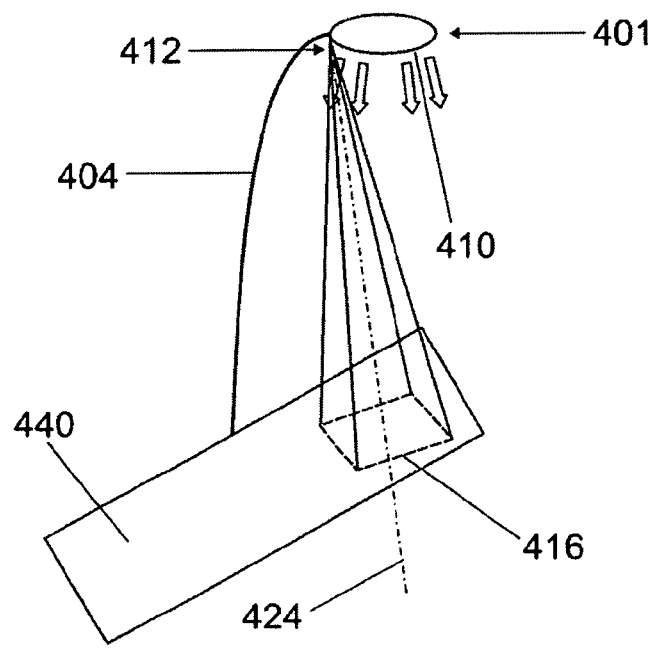
FIG. 8 shows a schematic illustration of a use of the fifth exemplary embodiment of the light-emitting unit according to the invention shown in FIG. 7 in a perspective view.

FIG. 8 shows a schematic illustration of a use of the fifth exemplary embodiment of the light-emitting unit 401 according to the invention shown in FIG. 7 in a perspective view.

The light-emitting unit 401 is in this case fastened on a post-like apparatus 404 and is operated in the "mixed mode". A walkway 440 is illuminated by its lighting unit 410, and an image 416, for example an advertisement, is projected onto this walkway by means of its projection unit 412.

Figure 9:
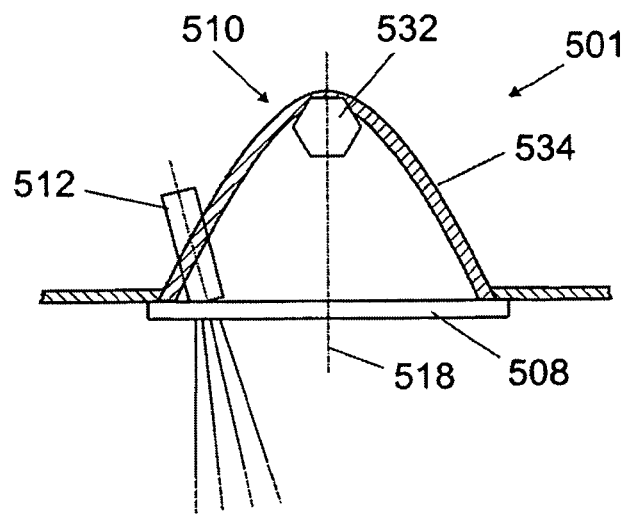
FIG. 9 shows a schematic illustration of a sixth exemplary embodiment of a light-emitting unit according to the invention in a partial section.

FIG. 9 shows a schematic illustration of a sixth exemplary embodiment of a light-emitting unit 501 according to the invention which is operated in the "projection mode" in a partial section.

As a deviation from the preceding exemplary embodiments, the light-emitting unit 501 is in the form of an LED downlight. It is inserted into a ceiling 2 of a room, for example a drywall ceiling, and has an approximately parabolic reflector 534 which is approximately rotationally symmetrical with a longitudinal axis 518. An LED light engine 532 is arranged in the reflector 534 at the top in FIG. 9. This LED light engine has a disk 508 for protecting the LED light engine on a lower side (in FIG. 9) of the light-emitting unit 501. Since the projection unit 512, owing to the compactness of the light-emitting unit 501, needs to be designed to be very small, it has a small laser projector.

Figure 10:
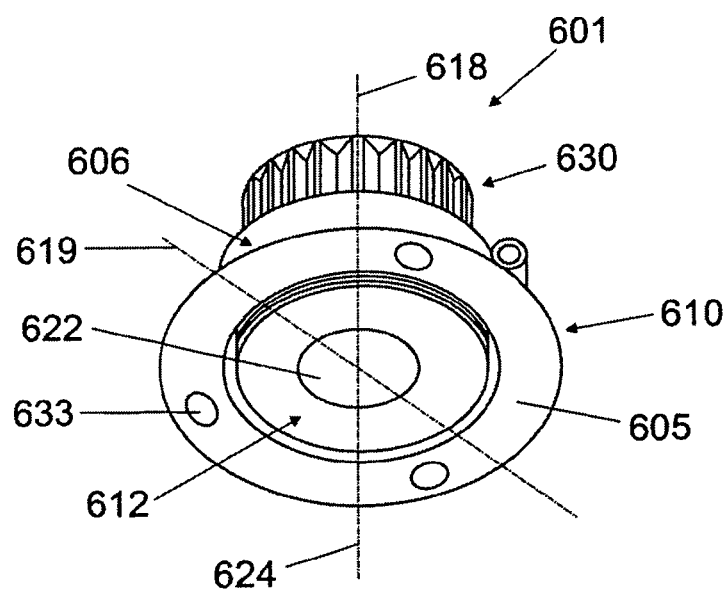
FIG. 10 shows a schematic illustration of a seventh exemplary embodiment of a light-emitting unit according to the invention in a perspective view.

FIG. 10 shows a schematic illustration of a seventh exemplary embodiment of a light-emitting unit 601 according to the invention in the "dark mode" in a perspective view.

As a deviation from exemplary embodiments shown, the light-emitting unit 601 has a projection unit 612, which is radially surrounded by a lighting unit 610. The lighting unit in this case has three LEDs 633 arranged around a longitudinal axis 618 of the lighting unit 610 on a peripheral section 605 of a housing 606. The projection unit 612 has a longitudinal axis or projection direction 624 and is pivotable about a pivot axis 619, with the result that the projection direction 624 is adjustable with respect to the longitudinal axis 618 of the lighting unit 610. The light-emitting unit 601 has a cooling unit 630 with cooling ribs for cooling purposes.

Figure 11:
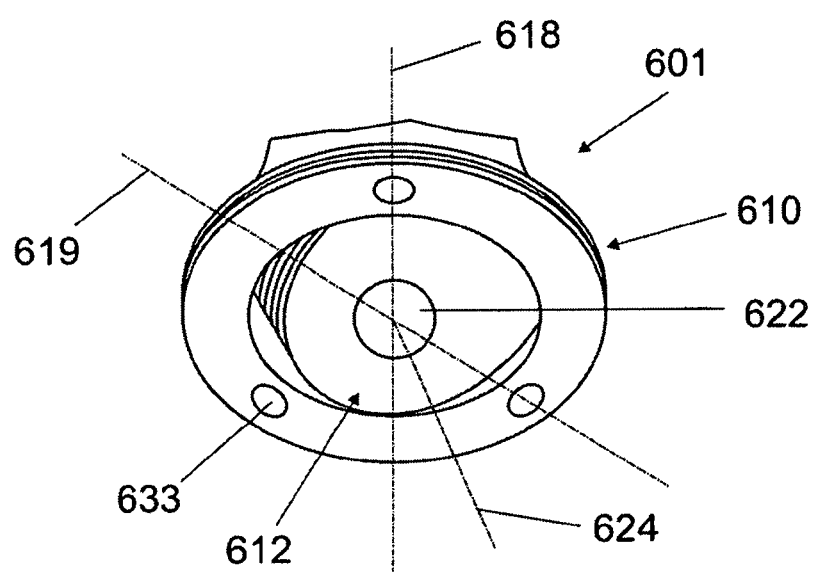
FIG. 11 shows a schematic illustration of the seventh exemplary embodiment of the light-emitting unit according to the invention shown in FIG. 10 with a varied projection direction in a perspective view.

FIG. 11 shows a schematic illustration of the seventh exemplary embodiment of the light-emitting unit 601 according to the invention shown in FIG. 10 with a projection unit 612 pivoted about the pivot axis 619 or with a changed projection direction 624 in a perspective view.

Figure 12:
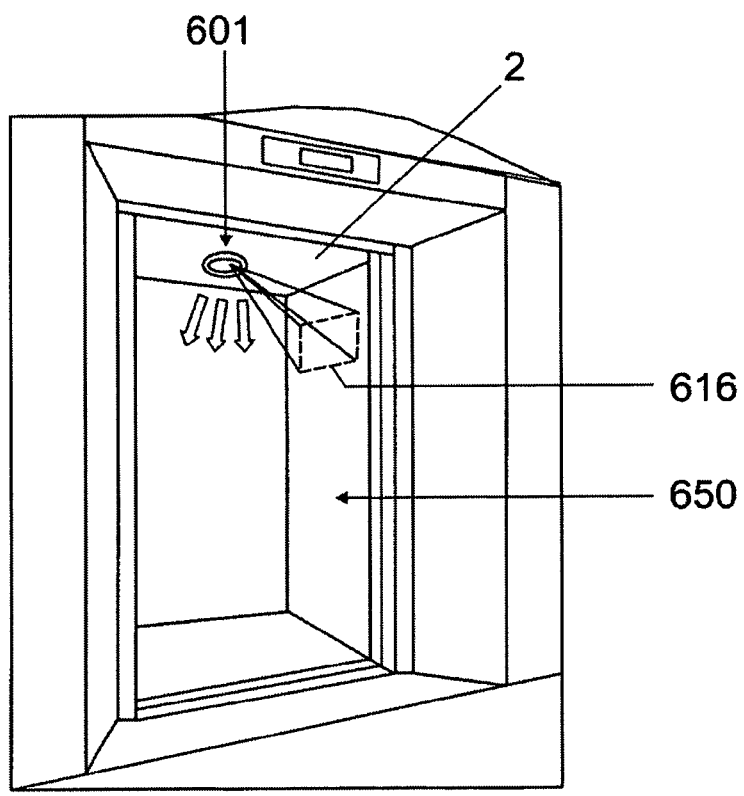
FIG. 12 shows a schematic illustration of a use of the seventh exemplary embodiment of the light-emitting unit according to the invention shown in FIGS. 10 and 11 in a passenger elevator.

FIG. 12 shows a schematic illustration of a use of the seventh exemplary embodiment of the light-emitting unit 601 according to the invention shown in FIGS. 10 and 11 in a passenger elevator 650.

The light-emitting unit 601 is arranged on the ceiling 2 of the passenger elevator 650 and outputs light (symbolized by the arrows) from the three LEDs 633 of the lighting unit 610 (cf. FIG. 11) into an interior of the passenger elevator 650. The projection unit 612 (cf. FIG. 11) is pivoted towards the right in FIG. 12, with the result that an image 616 is projected onto an inner wall of the passenger elevator 650.

FIGS. 13 to 16 show a schematic illustration of an eighth, ninth, tenth and eleventh exemplary embodiment of a light-emitting unit 701; 801; 901; 1001 according to the invention.

Figure 13:
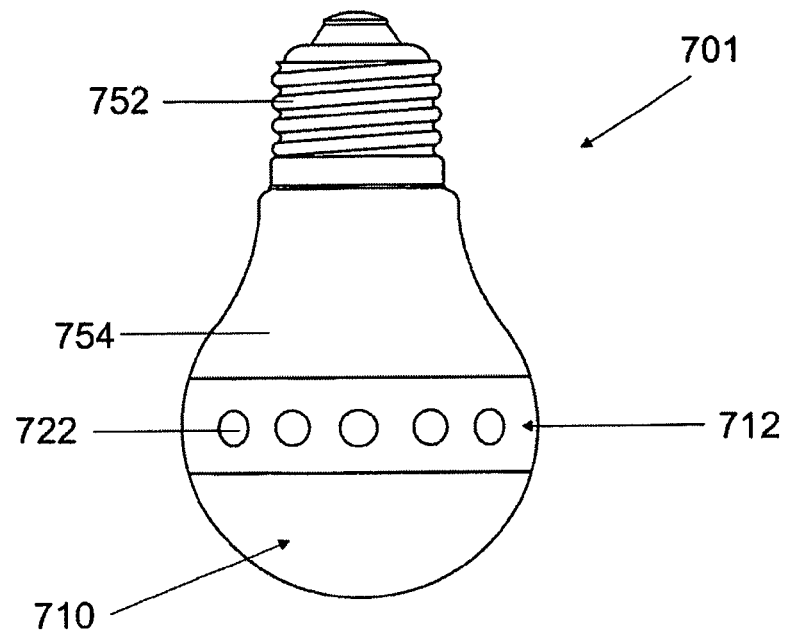
FIGS. 13 to 16 show a schematic illustration of an eighth, ninth, tenth and eleventh exemplary embodiment of a light-emitting unit according to the invention.

As a deviation from the previously shown exemplary embodiments, the light-emitting unit 701 shown in FIG. 13 has substantially the external shape of an incandescent lamp. It has a base 752, via which current can be supplied to said light-emitting unit, a transparent bulb 754, in which a lighting unit 710 and a projection unit 712 are arranged, and a plurality of fixed projection windows 722, via which an omnidirectional projection is enabled.

Figure 14:
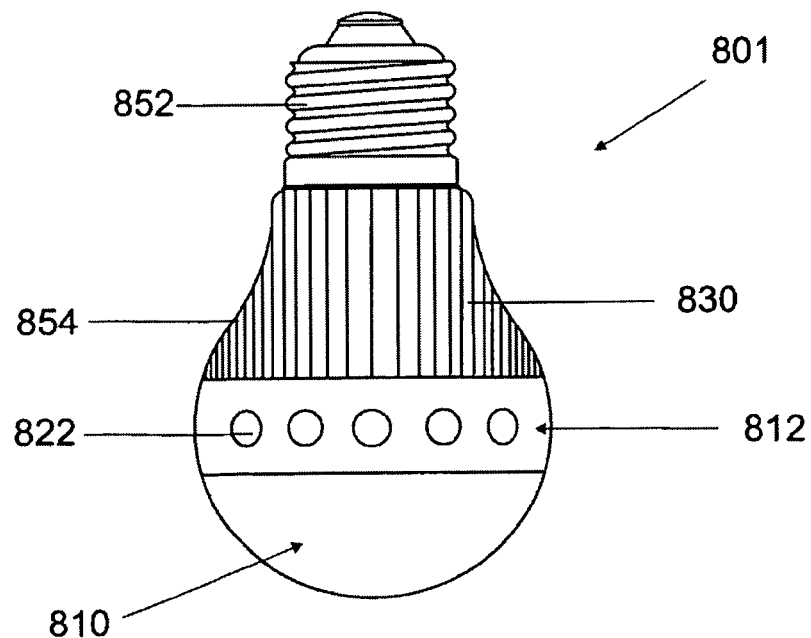

As a deviation from the eighth exemplary embodiment shown in FIG. 13, a ninth exemplary embodiment of the light-emitting unit 801 according to the invention shown in FIG. 14 demonstrates improved cooling of the light-emitting unit 801 by means of a heat sink or cooling unit 830 with cooling ribs distributed circumferentially on a bulb 854.

Figure 15:
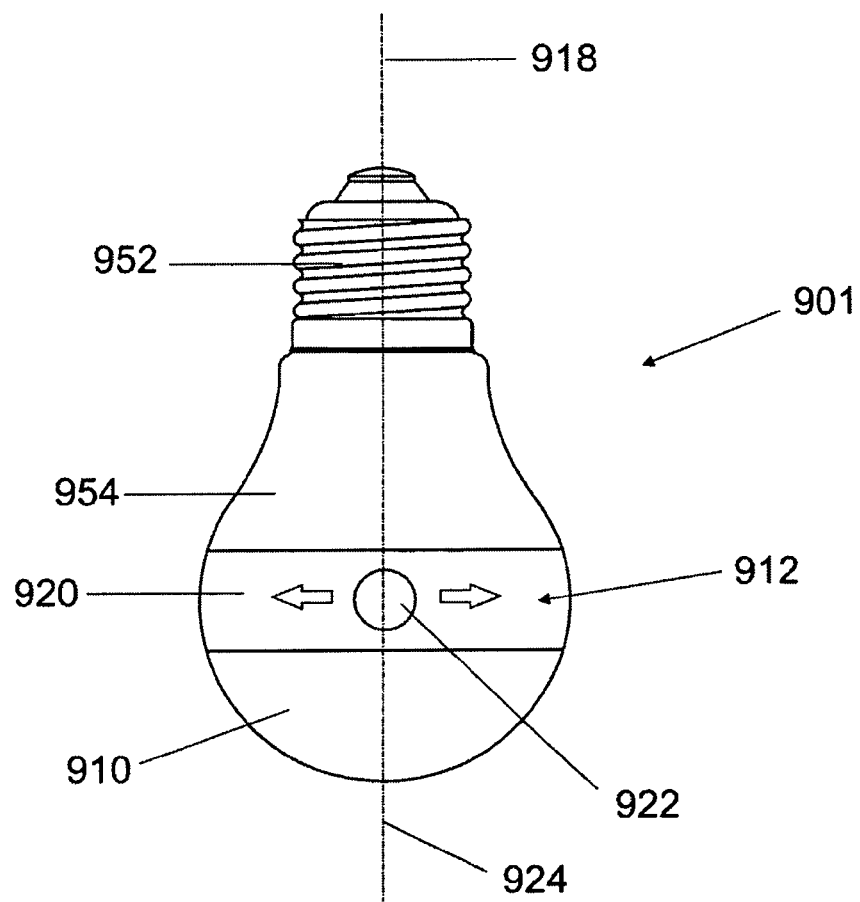
Figure 16:
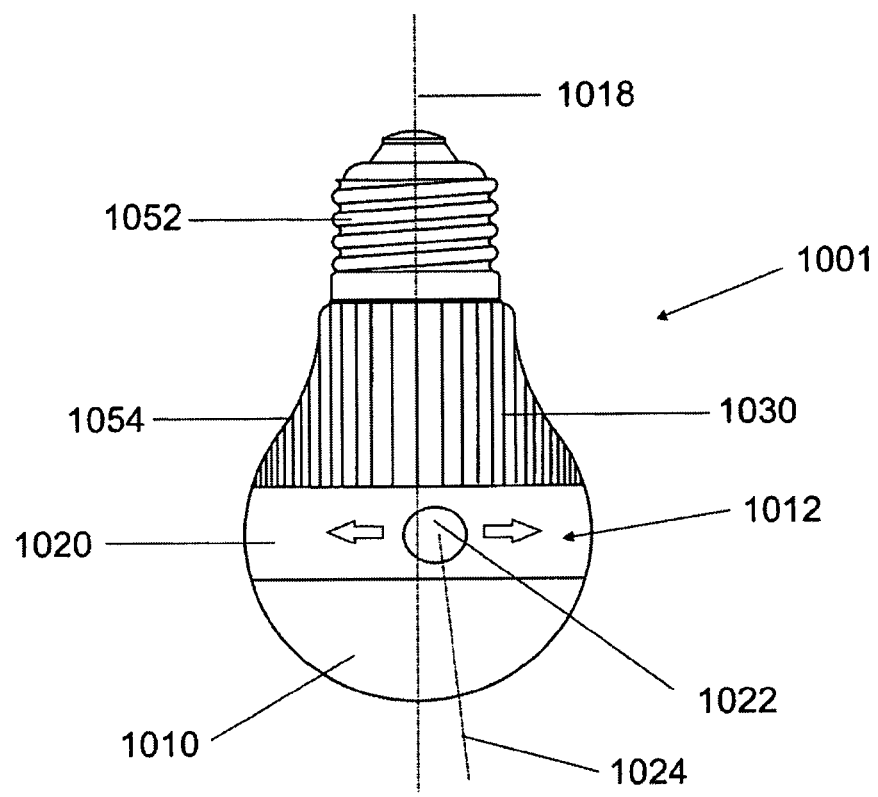

As a deviation from the eighth and ninth exemplary embodiments shown in FIGS. 13 and 14, the tenth and eleventh exemplary embodiments of the light-emitting unit 901; 1001 according to the invention shown in FIGS. 15 and 16 have a projection shield 920; 1020 which is rotatable about a longitudinal axis 918; 1018. Both exemplary embodiments of these figures have a laser projector with a small design as projection unit 912; 1012. The light-emitting unit 1001 shown in FIG. 16 differs from the light-emitting unit 901 shown in FIG. 15 by virtue of a cooling unit 1030 with cooling ribs distributed circumferentially on a bulb 1054.

Figure 17:
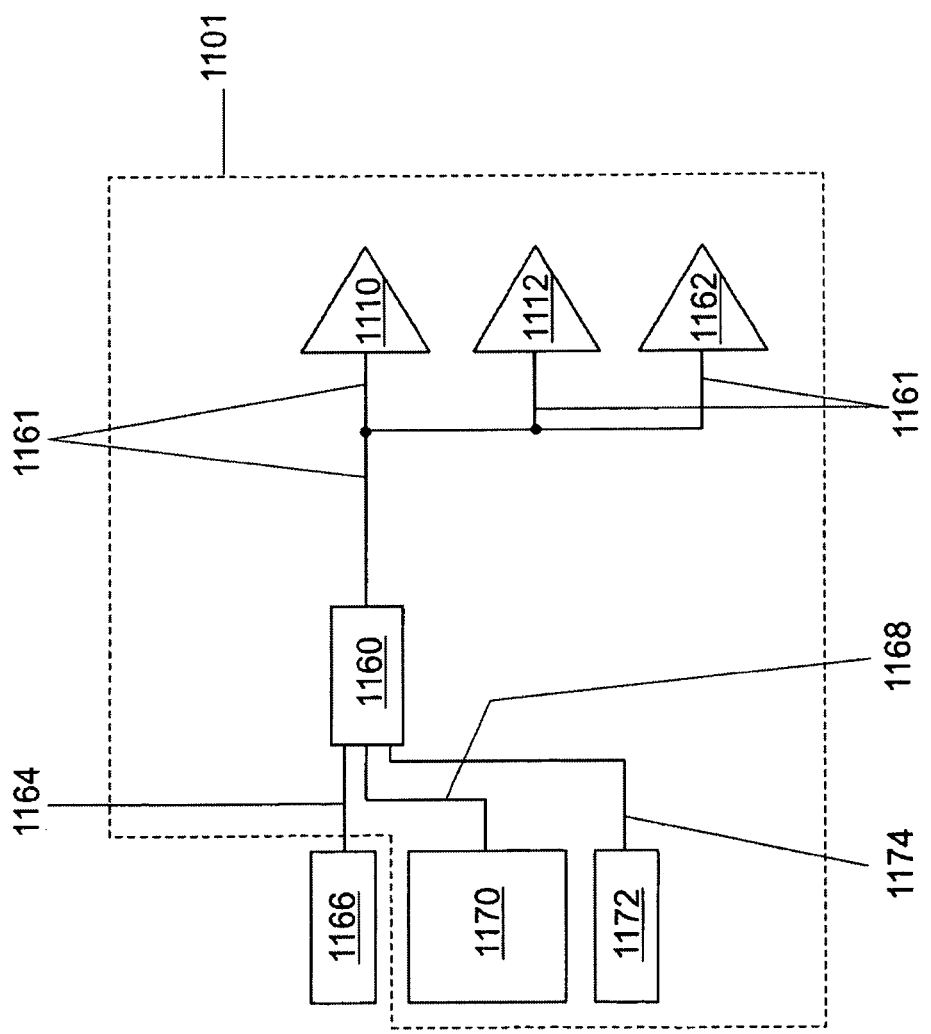
FIG. 17 shows a schematic circuit diagram of a light-emitting unit according to an embodiment of the invention.

FIG. 17 shows an exemplary embodiment of a schematic circuit diagram for a light-emitting unit 1101 according to the invention. The dashed line in FIG. 17 in this case represents a system boundary for the light-emitting unit 1101 according to the invention. Components within the system boundary belong to the light-emitting unit 1101.

A control unit 1160 is illustrated in the center in FIG. 17. It is connected to a lighting unit 1110, projection unit 1112, actuating unit 1162 to be actuated thereby via a data bus 1161. Thus, operating modes, operating states or properties of the units, such as a lighting intensity or a projection direction, of the light-emitting unit 1101 are thus controllable or variable via the actuation of the units 1110, 1112, 1162.

The control unit 1160 is also connected to a voltage source 1166 via a power line 1164. In order to input commands and in order to communicate with the control unit 1160, said control unit is connected or can be connected to a user interface 1170 (user control interface) via a Bluetooth connection 1168.

In order to store operating states, properties, sequence programs or projection contents etc., the light-emitting unit 1101 has a memory unit 1172, to which it is connected via a data bus 1174.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A light-emitting unit comprising:
a lighting unit capable of generating light; and
a projection unit capable of projecting an image using light generated by the projection unit,
a control unit operatively connected to the lighting unit and the projection unit to control their operation,
wherein the control unit is configured so that the lighting unit and the projection unit can be switched on and off independently of one another, and
wherein the control unit is configured so that the lighting unit and the projection unit can operate in:
 (a) a light-emitting mode in which only the lighting unit is switched on, and the projection unit is switched off or in a standby state;
 (b) a projection mode in which only the projection unit is switched on, and the lighting unit is switched off or in the standby state;
 (c) a mixed mode in which the lighting unit and the projection unit are switched on;
 (d) a dynamic mode in which the lighting unit and the projection unit are repeatedly switched between on and off or standby state; and
 (e) a dark mode in which the lighting unit and the projection unit are off or in the standby state.

2. The light-emitting unit of claim 1, wherein a lighting property of the lighting unit, or a projection property or a projection content of the projection unit is variable.

3. The light-emitting unit of claim 1, wherein the projection unit comprises a laser projector.

4. The light-emitting unit of claim 1, wherein the light-emitting unit has a projection window through which a projection takes place.

5. The light-emitting unit of claim 1, wherein a projection direction of the projection unit is fixed.

6. The light-emitting unit of claim 1, further comprising a control interface operatively connected to the control unit via a data link.

7. The light-emitting unit of claim 1, further comprising a memory unit operatively connected to the control unit via a data link.

8. The light-emitting unit of claim 1, wherein the control unit is operatively connected to the lighting unit and the projection unit by a data bus, a LAN connection, a WLAN connection, a Bluetooth connection, or an infrared connection.

9. The light-emitting unit of claim 1, further comprising a housing in which the lighting unit and the projection unit are accommodated at least sectionally.

10. The light-emitting unit of claim 1, wherein the projection unit is surrounded at least sectionally by the lighting unit.

11. The light-emitting unit of claim 1, wherein a longitudinal axis of the projection unit is approximately coaxial to a longitudinal axis of the lighting unit.

12. The light-emitting unit of claim 1, wherein the lighting unit and the projection unit are delimited by a base and a bulb.

13. The light-emitting unit of claim 1, wherein a projection direction of the projection unit is variable.

14. The light-emitting unit of claim 13, wherein the projection direction is variable via an actuating unit.

* * * * *